(12) United States Patent
Clarke

(10) Patent No.: US 10,239,250 B2
(45) Date of Patent: Mar. 26, 2019

(54) BLOW MOULDED CONTAINER AND MANUFACTURE THEREOF

(71) Applicant: Gr8 Engineering Limited, Chichester, West Sussex (GB)

(72) Inventor: Peter Reginald Clarke, Petworth (GB)

(73) Assignee: GR8 ENGINEERING LIMITED, Chichester, West Sussex (GB)

( * ) Notice: Subject to any disclaimer, the term of this patent is extended or adjusted under 35 U.S.C. 154(b) by 318 days.

(21) Appl. No.: 15/308,121

(22) PCT Filed: Apr. 30, 2015

(86) PCT No.: PCT/EP2015/059579
§ 371 (c)(1),
(2) Date: Nov. 1, 2016

(87) PCT Pub. No.: WO2015/166077
PCT Pub. Date: Nov. 5, 2015

(65) Prior Publication Data
US 2017/0100872 A1    Apr. 13, 2017

(30) Foreign Application Priority Data

May 1, 2014 (GB) .................................. 1407706.9

(51) Int. Cl.
*B29C 49/12*  (2006.01)
*B29C 49/06*  (2006.01)
(Continued)

(52) U.S. Cl.
CPC .......... *B29C 49/12* (2013.01); *B29C 49/0005* (2013.01); *B29C 49/06* (2013.01);
(Continued)

(58) Field of Classification Search
None
See application file for complete search history.

(56) References Cited

U.S. PATENT DOCUMENTS 3,341,644 A    9/1967  Allen
4,717,524 A *  1/1988  Aoki ................ B29C 49/06
                                         264/544

FOREIGN PATENT DOCUMENTS

CN    1778541 A     5/2006
EP    0240037 A2   10/1987
(Continued)

OTHER PUBLICATIONS

Search and Examination Report under Sections 17 and 18(3) dated Oct. 30, 2014 in GB1407706.9.
(Continued)

*Primary Examiner* — Jeffry H Aftergut
(74) *Attorney, Agent, or Firm* — Polsinelli, PC

(57) ABSTRACT

A method of forming a blow molded container in the form of a tub, the method comprising the steps of: providing an injection molded preform composed of a biaxially-orientable thermoplastic material, the preform being substantially planar; heating the preform; and stretch blow molding the heated preform within a mold cavity to form a tub having a bottom wall and an annular sidewall having an upper edge, the tub comprising biaxially oriented thermoplastic material in the annular sidewall and at least an outer portion of the bottom wall, the stretch blow molding step using at least one stretch rod to engage an inner side of the preform and axially to stretch at least a part of the preform prior to blowing a pressurized gas against the inner side which urges the opposite side of the preform radially outwardly against the mold.

41 Claims, 8 Drawing Sheets

(51) Int. Cl.
| | |
|---|---|
| *B29C 49/64* | (2006.01) |
| *B29C 51/04* | (2006.01) |
| *B29C 49/00* | (2006.01) |
| *B29C 49/24* | (2006.01) |
| *B29C 49/42* | (2006.01) |
| *B29L 31/00* | (2006.01) |
| *B29C 49/02* | (2006.01) |
| *B29C 49/16* | (2006.01) |
| *B29C 49/36* | (2006.01) |
| *B29C 51/02* | (2006.01) |
| *B29C 51/16* | (2006.01) |
| *B29C 51/22* | (2006.01) |
| *B29C 51/42* | (2006.01) |
| *B29K 101/12* | (2006.01) |
| *B29K 105/00* | (2006.01) |

(52) U.S. Cl.
CPC ...... *B29C 49/2408* (2013.01); *B29C 49/4247* (2013.01); *B29C 49/4268* (2013.01); *B29C 49/4273* (2013.01); *B29C 49/6436* (2013.01); *B29C 51/04* (2013.01); *B29C 49/02* (2013.01); *B29C 49/16* (2013.01); *B29C 49/36* (2013.01); *B29C 51/02* (2013.01); *B29C 51/162* (2013.01); *B29C 51/22* (2013.01); *B29C 51/422* (2013.01); *B29C 51/426* (2013.01); *B29C 2049/023* (2013.01); *B29C 2049/024* (2013.01); *B29C 2049/1214* (2013.01); *B29C 2049/1228* (2013.01); *B29C 2049/1238* (2013.01); *B29C 2049/241* (2013.01); *B29C 2049/2412* (2013.01); *B29C 2049/2447* (2013.01); *B29K 2101/12* (2013.01); *B29K 2105/253* (2013.01); *B29K 2995/0089* (2013.01); *B29L 2031/712* (2013.01); *B29L 2031/716* (2013.01); *B29L 2031/7132* (2013.01); *B29L 2031/7162* (2013.01)

(56) References Cited

FOREIGN PATENT DOCUMENTS

| | | |
|---|---|---|
| EP | 0293485 A1 | 12/1988 |
| EP | 0482652 A2 | 4/1992 |
| EP | 0978456 A1 | 2/2000 |
| EP | 1095755 A1 | 5/2001 |
| GB | 2055324 A | 3/1981 |
| GB | 2398267 A | 8/2004 |
| JP | 2004331104 A | 4/2003 |
| JP | 20030126010 | 4/2003 |
| WO | 2006005413 A1 | 1/2006 |
| WO | 2007101868 A2 | 9/2007 |
| WO | 2010060692 A1 | 6/2010 |

OTHER PUBLICATIONS

Int'l. Search Report and Written Opinion dated Nov. 17, 2015 in PCT/EP2015/059579.

Examination Report under Section 18(3) dated Aug. 31, 2016 in GB1407706.9.

Office Action in corresponding Chinese Patent Application No. 201580033316.3 dated May 16, 2018.

Office Action Summary in corresponding Chinese Patent Application No. 201580033316.3 dated May 16, 2018.

* cited by examiner

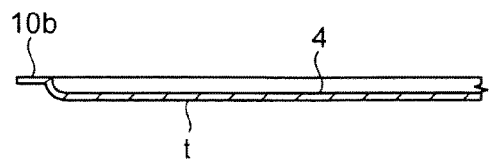
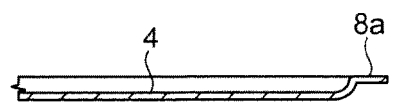
FIG. 2A  FIG. 2B
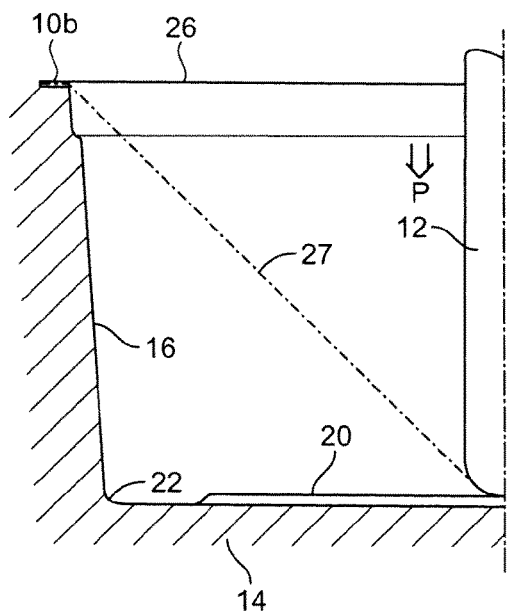
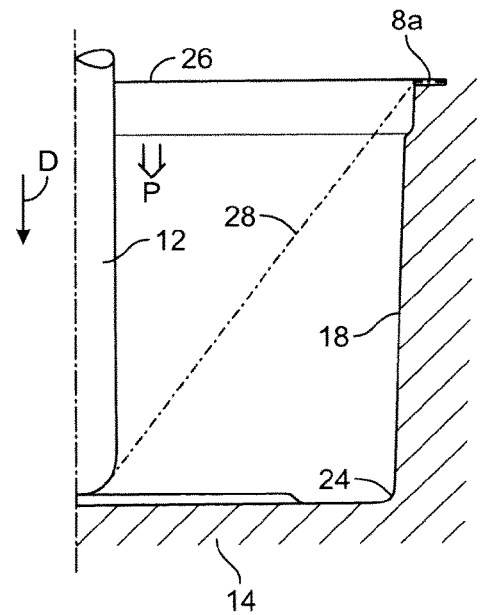
FIG. 3A  FIG. 3B

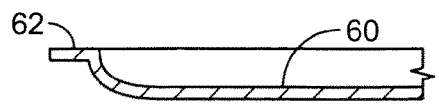
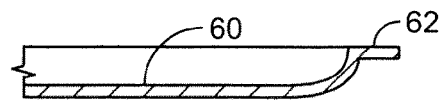
FIG. 5A    FIG. 5B
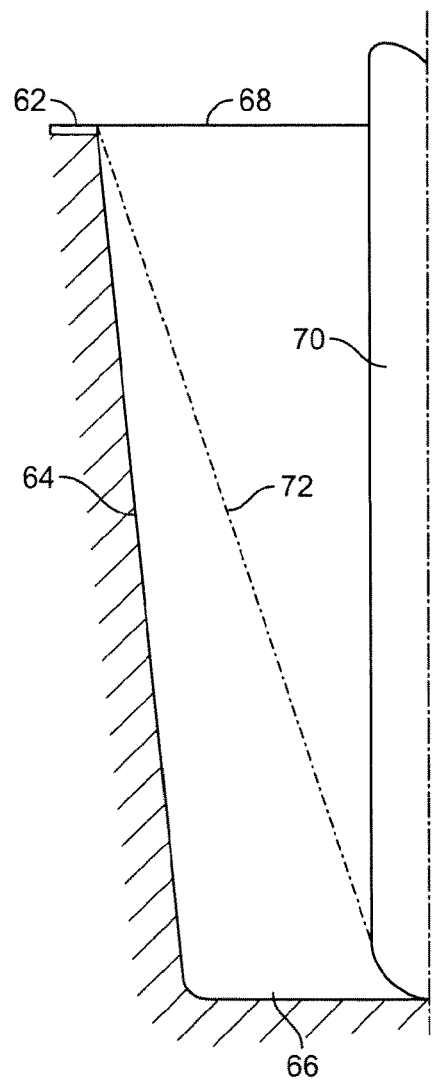
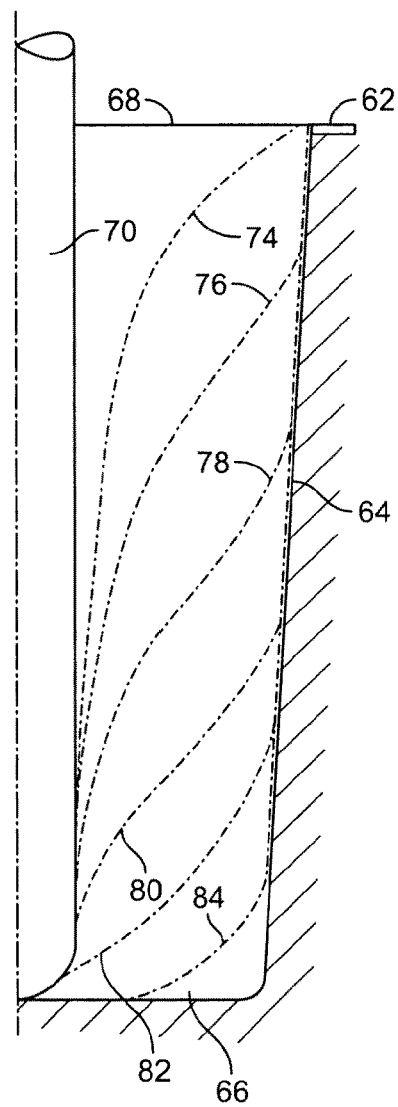
FIG. 6A    FIG. 6B

# BLOW MOULDED CONTAINER AND MANUFACTURE THEREOF

FIELD OF THE INVENTION

The present invention relates to a blow moulded container in the form of a tub, to a method of forming a blow moulded container in the form of a tub and to an apparatus for forming a blow moulded container.

BACKGROUND OF THE INVENTION

In this specification the term "tub" is employed as a general term meaning a wide mouth container which may be in the form of a tub, as that term may be used by some of those skilled in the art of moulded polymer containers, a tray, a pot, a jar, a cup, etc. The wide mouth of the container has an opening which has substantially the same or greater dimensions and area as compared to the body and base of the container. The "tub" may have a variety of different shapes, dimensions and aspect ratios. The invention is particularly directed to containers which have a shape and configuration, for example a cauldron shape, which means that they cannot be formed by known thermoforming processes in which a sheet or film of blown or extruded thermoplastic material is heated and then blown or impressed against the inside surface of a female mould cavity having an inner moulding surface shaped to mould the outer surface of the desired container.

In the packaging industry, the process of blow moulding is often used in the manufacture of containers, particularly bottles for carbonated beverages. This process involves the initial formation of a preform, typically by injection moulding, which preforms are subsequently blow moulded to form the containers. Such preforms are typically formed of thermoplastic material, particularly polyethylene terephthalate (PET).

For the manufacture of containers in the form of tubs, typically thermoforming is used. A sheet of thermoplastic material, typically a polyolefin, is heated and then urged, by a movable mould member and a blowing pressure, into a mould cavity. Tubs often suffer from the problem of poor mechanical properties, in particular poor impact resistance, particularly at low temperatures. This is because the thermoformed thermoplastic tends to exhibit poor molecular alignment or orientation, which may be monoaxial orientation or only a low degree of biaxial orientation. It is well known that biaxial orientation increases polymer toughness in thermoplastic packaging. However, conventional thermoforming processes tend to produce no or only low biaxial orientation, particularly in regions of the packaging which may be subjected to the greatest impact stresses during use, and so which require the greatest toughness or impact resistance.

The present invention aims at least partially to overcome these problems of known containers and corresponding container manufacturing methods. There is a need in the art for a container, and a corresponding method of manufacture, which provides cost-effective containers having dimensions to enable them to be used as tubs and which have good mechanical properties, for example impact resistance.

SUMMARY OF THE INVENTION

The present invention provides a method of forming a blow moulded container in the form of a tub, the method comprising the steps of:

i) providing an injection moulded preform composed of a biaxially-orientable thermoplastic material, the preform being substantially planar, wherein the substantially planar preform has a surface area A of from 5,000 to 50,000 mm$^2$, wherein the substantially planar preform has a wall thickness T of from 0.3 to 2.5 mm, over at least a central major portion of the preform, and wherein the substantially planar preform has an average bulk width W' and a bulk depth D', the bulk depth D' being at most 25 mm, and the ratio of average bulk width W':bulk depth D', defining a bulk aspect ratio, is at least 5:1;
ii) heating the preform; and
iii) stretch blow moulding the heated preform within a mould cavity to form a tub having a bottom wall and an annular sidewall having an upper edge, the tub comprising biaxially oriented thermoplastic material in the annular sidewall and at least an outer portion of the bottom wall, the stretch blow moulding step using at least one stretch rod to engage an inner side of the preform and axially to stretch at least a part of the preform prior to blowing a pressurized gas against the inner side which urges the opposite side of the preform radially outwardly against the mould, wherein the tub bottom wall has a surface area of from 3,500 to 40,000 mm$^2$ and the annular sidewall has a height of from 35 to 150 mm.

The present invention further provides a blow moulded container in the form of a tub composed of a thermoplastic material, the tub having a bottom wall and an annular sidewall having an upper edge, the tub comprising biaxially oriented thermoplastic material in the annular sidewall and at least an outer portion of the bottom wall, wherein the average stretch ratio of the biaxially oriented thermoplastic material in the annular sidewall and at least the outer portion of the bottom wall is from 1.5:1 to 15:1, optionally from 1.5:1 to 10:1, for example about 10:1.

The present invention further provides an apparatus for forming a blow moulded container in the form of a tub, the apparatus comprising a female mould portion having a mould cavity with an open face, the mould cavity having a bottom wall and an annular sidewall, an upper edge of the annular sidewall surrounding the open face, a preform placing device for placing an individual substantially planar preform onto the female mould portion so as to cover the open face of the mould cavity, a longitudinal elongate stretch rod having a free end directed towards the open face, a moving device for reciprocally moving the stretch rod along a direction aligned with a longitudinal axis of the stretch rod between a first position, at which the stretch rod is located adjacent to the female mould portion and the free end is remote from the mould cavity, and a second position, at which the stretch rod is located at least partly within the mould cavity, and a gas blowing device for blowing gas against a side of the placed preform facing away from the mould cavity.

Preferred features are defined in the dependent claims.

The present invention on predicated on the finding by the present inventor that a tub having excellent mechanical properties, in particular impact resistance, can be obtained by using biaxial orientation to form the tub, which introduces biaxial orientation at the corners of the tub and imparts high impact resistance to the tub, even at low temperatures.

BRIEF DESCRIPTION OF THE DRAWINGS

Embodiments of the present invention will now be described by way of example only with reference to the accompanying drawings, in which:

FIGS. 2a and 2b are schematic cross-section on lines X-X and Y-Y, respectively, of the preform of FIG. 1.

FIGS. 3a and 3b are schematic cross-sections of portions a tub blow moulded from the preform of FIG. 1 in accordance with a second embodiment of the present invention.

FIGS. 3a and 3b respectively showing the portions corresponding to the preform sections on lines X-X and Y-Y, the shape of the preform after stretching by the stretch rod and before blow moulding also being shown.

FIGS. 5a and 5b are schematic cross-sections through portions of a preform according to a fourth embodiment of the present invention.

FIG. 6a is a schematic cross-section of the preform portion of FIG. 5a after axial stretching by a stretch rod in a mould cavity prior to blow moulding according to a fifth embodiment of the present invention.

FIG. 6b is a schematic cross-section of the preform portion of FIG. 5b after stretch blow moulding into a mould cavity having a counter pressure, and progressive deformation of the thermoplastic material during the blow moulding according to a sixth embodiment of the present invention.

DETAILED DESCRIPTION

Figure 1:
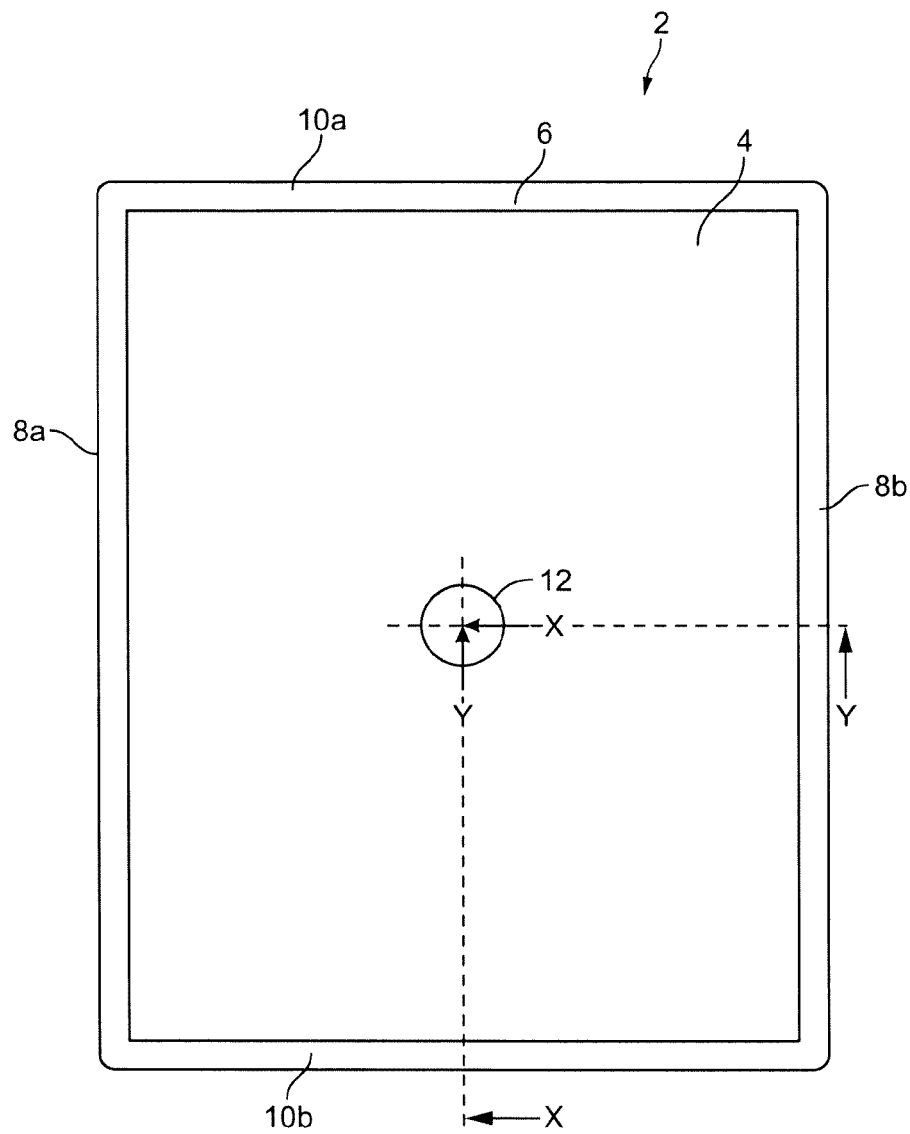
FIG. 1 shows a plan view of a preform for forming a tub, and the location of a stretch rod for manufacture of the tub, in accordance with a first embodiment of the present invention.

Referring to the plan view of FIG. 1, and FIGS. 2a and 2b which are schematic cross-section on lines X-X and Y-Y, respectively, of the plan view of FIG. 1, there is shown an injection moulded preform 2 for forming a blow moulded tub.

The injection moulded preform is composed of a biaxially-orientable thermoplastic material. In some embodiments, the thermoplastic material comprises polyester, typically at least one polyalkylene polyester or a blend of polyalkylene polyesters. Preferably the polyester comprises at least one polyester selected from polyethylene terephthalate, polybutylene terephthalate, polyethylene naphthalate and polybutylene naphthalate. In other embodiments, the thermoplastic material comprises polyolefin, typically at least one polyolefin selected from polyethylene, polypropylene and polybutylene.

The injection moulded material of the preform 2 is substantially unoriented and amorphous or alternatively the material may be semi-crystalline and have some orientation resulting from the injection moulding process.

The preform 2 comprises a central recessed portion 4 surrounded by a raised peripheral flange 6. The raised peripheral flange 6 includes two opposed longitudinal edges 8a, 8b and two opposed transverse edges 10a, 10b. Although in the illustrated embodiment the central recessed portion 4 is shown with constant thickness, this is merely illustrative and is not essential and the portion 4 may vary in thickness. For example, the central recessed portion 4 may be thicker in the middle and may be progressively thinner towards an outer edge of the portion 4. Typically the raised peripheral flange 6 has a constant thickness.

In this embodiment, the preform 2, and correspondingly the resultant blow moulded tub, have a rectangular plan. However, the preform 2 and the tub may have any other desired shape. For example, the preform 2 and the resultant tub may have a horizontal cross-section which is substantially shaped as follows: circular, oval, elliptical or polygonal, optionally square or rectangular. Furthermore, the vertical cross-section may have any desired shape or configuration.

The flange 6 is pre-shaped to form the upper edge of the tub, and may include a lid-engaging or sealing surface structure composed of the thermoplastic material which is substantially unoriented. Accordingly, in preferred embodiments the upper edge of the container is adapted to engage a lid and the an outer edge, defined by the flange 6 in the illustrated embodiment, of the injection moulded preform is pre-shaped with a lid-engaging or sealing surface structure which is present in the stretch blow moulded tub.

The preform 2 is substantially planar. This means that overall general shape and configuration is planar but the preform may have some localised three-dimensional shaping. In preferred embodiments, the substantially planar preform 2 has a wall thickness (T) of from 0.3 to 2.5 mm, optionally from 0.5 to 1.9 mm, further optionally from 0.7 to 1.9 mm or from 0.5 to 1 mm, over at least a central major portion of the preform. Typically the average wall thickness of the substantially planar preform 2 is from 0.3 to 2.5 mm, optionally from 0.5 to 1 mm. The substantially planar preform 2 has a surface area (A) of from 5,000 to 50,000 mm$^2$. Typically, the substantially planar preform 2 has a maximum width (W), which in the illustrated embodiment is the length of the longitudinal sides 8a, 8b, and an average wall thickness T, and the ratio of width (W):wall thickness (T) is from 250:1 to 350:1, optionally about 300:1. The 300:1 ratio for the parameters of entire length of the preform:preform wall thickness corresponds to a 150:1 ratio for the parameters of injection length extending from a central injection gate:preform thickness. The substantially planar preform 2 has an average bulk width W' and a bulk depth D', and the ratio of average bulk width W':bulk depth D', defining a bulk aspect ratio, is at least 5:1, optionally from 5:1 to 10:1. The bulk depth D' is at most 25 mm, typically from 2 to 25 mm, more typically from 5 to 20 mm.

In order to achieve such high width:wall thickness aspect ratios, and low wall thickness preforms, and preforms having a high bulk aspect ratio, using thermoplastic materials which are compatible with both injection moulding to form the preform and the subsequent stretch blow moulding to form the container, a high pressure injection moulding process is required, such as disclosed in the Applicant's earlier patent specifications WO-A-2009/044142 and WO-A-2011/039296.

As mentioned above, the wall thickness of the central recessed portion 4 may be varied. For example, for any wall thickness value (T) discussed above, the central recessed portion 4 may be thinnest in a middle portion which has a diameter corresponding to about twice the stretch rod diameter, and the wall thickness increases to become progressively thicker in a direction towards the outer periphery of the base. This provides that the area of the preform base that will form the bottom corners of the resultant container has an increased wall thickness as compared to the thinnest part of the preform, the increase having a typical dimension of about 0.2 mm to 0.3 mm. The wall thickness then progressively thins down to the inward edge of the flange 6, where the stretchable part of the preform meets the un-stretched rim of the preform.

Figure 9A:
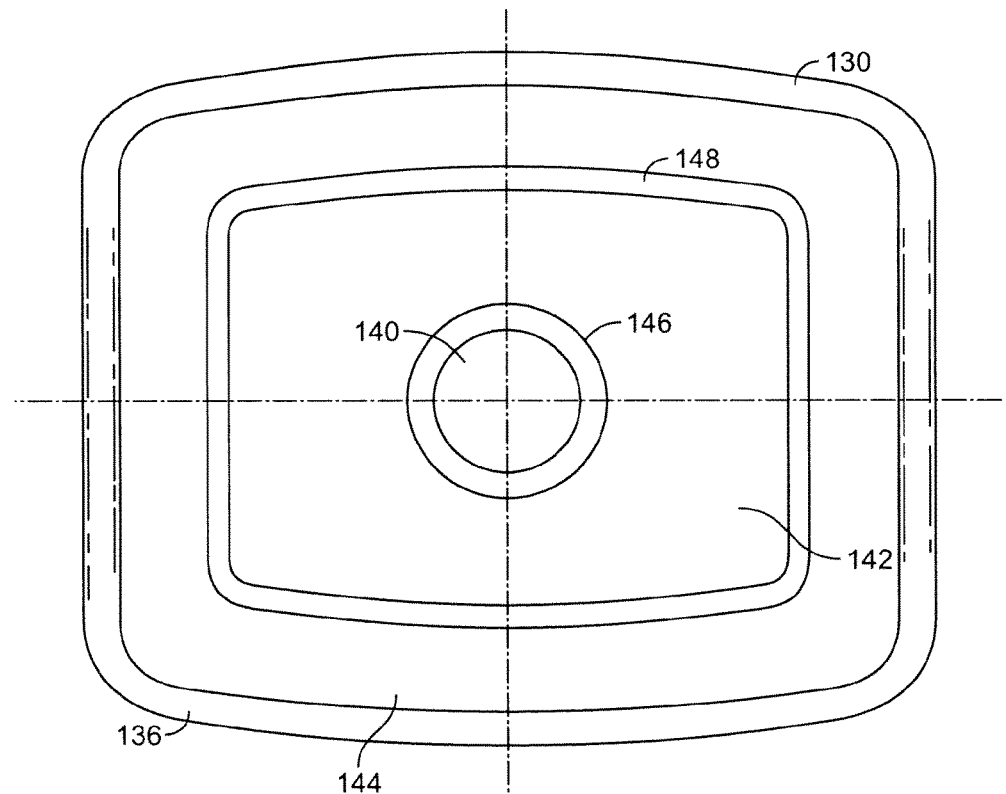
FIGS. 9a and 9b are schematic plan and cross-sectional views of a preform according to an eighth embodiment of the present invention.
Figure 9B:
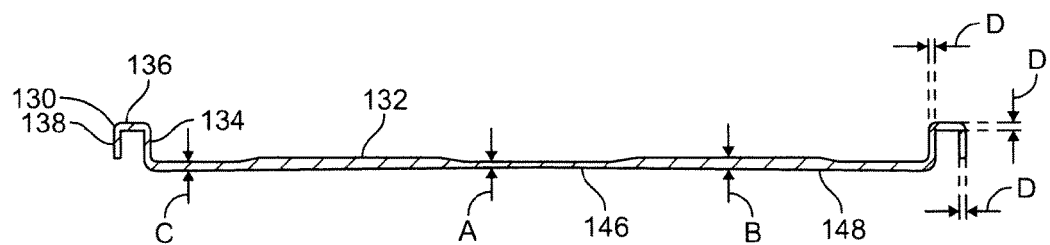

FIGS. 9a and 9b are a plan and a cross-section respectively of a preform 130 according to one embodiment for forming a rectangular tub. The preform 130 includes a central recessed portion 132, an inner peripheral upstanding edge 134, an upper flange 136 and an outer downwardly directed peripheral edge 138. In the central recessed portion 132, a central region 140 has a reduced thickness A, an annular intermediate region 142 has an increased thickness B and an outer region 144 has a reduced thickness C. Transition regions 146, 148 of progressively changing thickness are respectively located between the central region 140 and the annular intermediate region 142 and the annular intermediate region 142 and the outer region 144. The reduced thickness A is typically from 0.5 to 0.75 mm, for example about 0.6 mm; the increased thickness B is typically from 0.75 to 1.2 mm, for example about 0.9 mm; and reduced thickness C is typically from 0.5 to 0.75 mm, for example about 0.6 mm. The inner peripheral upstanding edge 134, upper flange 136 and outer downwardly directed peripheral edge 138 typically have the same thickness D, which is optionally less than the thickness of the central recessed portion 132, for example from 0.4 to 0.6 mm, such as about 0.5 mm.

FIG. 1 also shows the location of a stretch rod 12 for manufacture of the tub, as described hereinbelow. The stretch rod 12 has a cylindrical shape with a hemispherical free lower end. The stretch rod 12 may include a central conduit for introducing a blowing gas under pressure downwardly into the mould cavity during the blowing operation, the outer surface of lower end of the stretch rod 12 including gas outlet holes communicating with the central conduit. Typically, the stretch rod 12 has a diameter of from 12 to 20 mm, typically from 14 to 18 mm, most typically about 16 mm.

FIGS. 3a and 3b are schematic cross-sections of portions a tub blow moulded from the preform of FIG. 1, FIGS. 3a and 3b respectively showing the portions corresponding to the preform sections on lines X-X and Y-Y, the shape of the preform after stretching by the stretch rod and before blow moulding also being shown.

The preform 2 is heated with at least one heated element. The heating may be conductive by contact with the at least one heated element or alternatively may be heated by infrared or near-infrared radiation or may be preheated using infrared or near-infrared radiation and then conditioned conductively using contact with the at least one heated element. In preferred embodiments, the preform 2 is differentially heated so that preform material in a first region of the preform 2, which is to form a corner in the resultant tub between a tub bottom wall and a tub annular sidewall, is heated to a lower temperature than at least one adjacent second region of the preform 2. This reduces the stretching in that lower temperature region during axial stretching, thereby ensuring that sufficient material thickness is present in that region after axial stretching to achieve a desired thickness in the corners of the tub after the subsequent blow moulding step.

The present invention may use a continuous "one step" moulding process in which the preform is injection moulded and then the still-heated preform is blow moulded. The "one step" moulding process employs a preform which is sufficiently thick, for example up to 4 mm thick, so that sufficient heat is retained within the preform for the blow moulding of the preform.

Alternatively, the present invention may use a discontinuous "two step" moulding process, called a reheat blow moulding process, in which the preform is injection moulded and then cooled, and subsequently the cooled preform reheated and then is blow moulded. The "two step" moulding process may employ a preform which is thin, so that the preform can be rapidly and uniformly reheated for the blow moulding of the preform. The reheat blow moulding process tends to provide increased biaxial orientation, and therefore increased mechanical properties in thinner and lighter containers, in the resultant containers as compared to the one step process.

In some embodiments, the method is a two-step reheat blow moulding method in which the injection moulded preform 2 is cooled to ambient temperature prior to the heating step ii). In some embodiments, the heating step heats the preform 2 from a temperature of less than 35° C. in a reheat step after the injection moulded preform has cooled, after the injection moulding step, to a temperature of less than 35° C.

The heated preform 2 is then placed in the mould 14, being located so as to extend across an open face 26 of the mould cavity. The mould cavity is defined by opposed longitudinal walls 16, opposed transverse walls 18 and a bottom wall 20. This forms longitudinal corners 22 and transverse corners 24. Other shapes and configurations to introduce corresponding structure into the walls or base of the tub, such as indents, shoulders, etc. may be provided, as is known in the art. The flange 6 is not blow moulded but is clamped in position around and above the mould cavity, acting to hold the preform in position during the blow moulding step.

Then the stretch rod 12 is lowered in the direction of arrow D. This causes the preform 2 to be deformed and stretched downwardly to form a substantially inverted conical shape. The stretch rod 12 engages an inner side of the preform 2 and axially stretches at least a part of the preform 2 prior to a subsequent blowing step. After the preform 2 has been axially stretched by the stretch rod 12 and before blowing of the pressurized gas against the inner side during a blowing step, the axially stretched preform includes a portion with a substantially truncated conical or pyramidal shape having an axis aligned with the respective stretch rod 12.

In the illustrated embodiment, the axially stretched preform includes opposed longitudinal inclined sides 27 and opposed transverse inclined sides 28.

The stretch rod introduces axial orientation into at least a central part of the preform 2. The stretch rod 12 is moved a selected downward distance against the preform 2 so that the stretch rod axially stretches at least part of the substantially planar preform by a distance which is from 75 to 100% of the height of the annular sidewall of the resultant tub, the height corresponding to the depth of the opposed longitudinal walls 16 and opposed transverse walls 18 of the mould cavity. As shown in FIGS. 3a and 3b, preferably the stretch rod is moved downwardly by a distance which is substantially the entire depth of the opposed longitudinal walls 16 and opposed transverse walls 18, and urges the preform material against the bottom wall 20.

In the illustrated embodiment, a single stretch rod 12 is used but in alternative embodiments a plurality of mutually laterally spaced stretch rods is provided which engage respective mutually spaced areas on the inner side of the preform.

After the axial stretching by the stretch rod 12, a pressurized blowing gas, such as air, is blown against the inner side of the preform 2. The pressurized blowing gas is indicated by arrows P. As discussed above, the pressurized blowing gas may be wholly or partly emitted from the stretch rod 12. Typically, the pressurized gas has a pressure of from 10 to 30 bar ($10 \times 10^5$ to $30 \times 10^5$ N/m$^2$), more typically from 10 to 15 bar ($10 \times 10^5$ to $15 \times 10^5$ N/m$^2$).

The pressurized gas urges the opposite side of the preform 2 radially outwardly against the mould 14, to define the desired shape of the blow moulded tub, the tub having a bottom wall and an annular sidewall having an upper edge defined by the preform flange 6.

The preform thickness can be varied in conjunction with differential contact heating, described above, of the preform to maintain a substantially even wall section or a locally thicker wall in the resultant container. For example the annular edge parts of the preform may have a constant thickness because these edge parts are commonly contacted during heating and therefore may be heated to a common temperature whereas the central area of the preform may have varying thickness so as to be conductively heated to correspondingly different temperatures by conductive heating.

The combination of the axial stretch and the radial blowing produce biaxially oriented thermoplastic material in the annular sidewall and at least an outer portion of the bottom wall of the tub. The pressurized gas introduces hoop orientation into at least an outer part of the preform 2, including the annular sidewall and at least an outer portion of the bottom wall of the tub. Typically, the average stretch ratio of the biaxially oriented thermoplastic material in the annular sidewall and at least the outer portion of the bottom wall is from 1.5:1 to 15:1, optionally from 1.5:1 to 10:1, for example about 10:1.

The upper edge of the tub may include a lid-engaging or sealing surface structure composed of the thermoplastic material which is substantially unoriented.

By having high biaxial orientation, the tub is adapted to contain a frozen product at a temperature of less than 0° C., for example ice-cream or sorbet.

Typically, the tub bottom wall has a surface area of from 3,500 to 40,000 mm$^2$ and the annular sidewall has a height of from 35 to 150 mm. Preferably, the resultant tubs are nestable or stackable. Alternatively, the upper edge of the tub is located inwardly of the annular sidewall of the tub to form a tub opening smaller in area than the area of the body of the tub, optionally the tub being shaped as a cauldron.

Figure 4A:
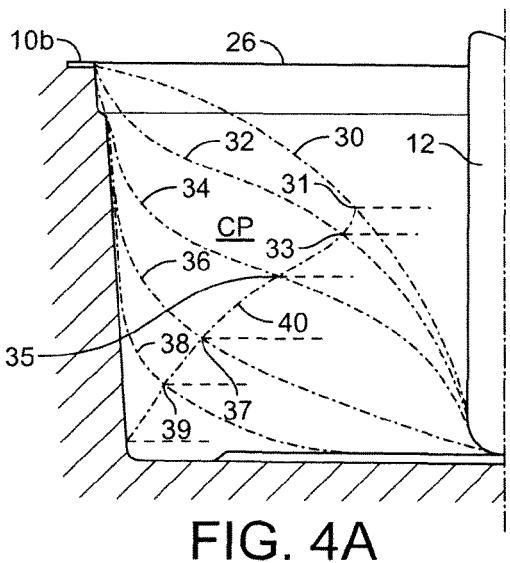
FIGS. 4a and 4b are schematic cross-sections of portions a tub blow moulded from the preform of FIG. 1 in accordance with a third embodiment of the present invention, FIGS. 4a and 4b showing the deformation of the thermoplastic material after stretch blow moulding into a mould cavity having a counter pressure, and progressive deformation of the thermoplastic material during the blow moulding.
Figure 4B:
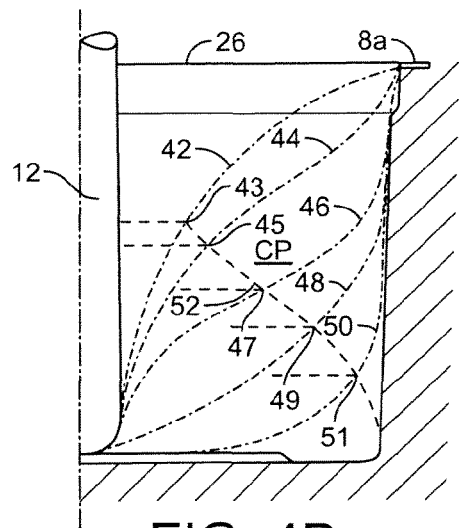

FIGS. 4a and 4b are schematic cross-sections of portions of a tub blow moulded from the preform of FIG. 1 in accordance with a third embodiment of the present invention, which is a modification of the method of FIGS. 3a and 3b. FIGS. 4a and 4b show the deformation of the thermoplastic material after stretch blow moulding into a mould cavity having a counter pressure, and progressive deformation of the thermoplastic material during the blow moulding.

As shown in FIGS. 4a and 4b, the stretch blow moulding step iii) is controlled so that prior to the stretch blow moulding step the mould cavity is pre-pressurized with a gas which provides a counter pressure CP as illustrated. Typically, the pre-pressurized gas has a pressure of from 5 to 15 bar ($5 \times 10^5$ to $15 \times 10^5$ N/m$^2$), more typically from 8 to 12 bar ($8 \times 10^5$ to $12 \times 10^5$ N/m$^2$). The pre-pressurization is present at least prior to the blowing step, and may be may be present during the preceding axial stretching step carried out by the stretch rod. The counter pressure gas may be introduced into the mould cavity before axial stretching and/or after axial stretching but before blow moulding.

After the preform 2 has been axially stretched by the stretch rod 12, and before blowing of the pressurized gas against the inner side, the pre-pressurized gas applies a resistance force against the opposite side of the preform 2. This causes at least one region of the axially-stretched preform 2 surrounding the stretch rod 12 to bow radially inwardly towards the stretch rod 12. Rather than have substantially straight linear preform portions extending from the free end of the stretch rod 12 to the upper peripheral edge of the open face 26 of the mould cavity, as show in FIGS. 3a and 3b, the longitudinal and transverse preform walls 30, 42 are curved. The preform 2 has been axially stretched by the stretch rod against the pre-pressurized gas applying the counter pressure CP so that before blowing of the pressurized gas against the inner side, the axially stretched preform 2 includes a portion with a substantially truncated conical or pyramidal shape having an axis aligned with a respective stretch rod and with the truncated conical or pyramidal surface having at least one concave inwardly-curved side.

During the subsequent blowing step, the longitudinal and transverse preform walls 30, 42 are blown downwardly and outwardly by the blown pressurized gas so as to be urged against the mould surfaces for forming the tub. The counter pressure resists this movement, and caused deformation of the thermoplastic material of the preform.

As shown in FIGS. 4a and 4b, the longitudinal and transverse preform walls 30, 42 assume a series of successive positions during the blowing step, as respectively indicated by lines 32, 34, 36 and 38 for the longitudinal preform walls 30 and the lines 44, 46, 48 and 50 for the transverse preform walls 42. The line 40 indicates the locus of movement of the centre points 31, 33, 35, 37 and 39 of the longitudinal preform walls 30 during the blowing step. Correspondingly, the line 52 indicates the locus of movement of the centre points 43, 45, 47, 49 and 51 of the transverse preform walls 42 during the blowing step. It may be seen that the thermoplastic material at the centre points 31 and 43 of the preform walls 30, 42 after axial stretching by the stretch rod 12 and prior to the blowing step are ultimately located in the tub substantially at the longitudinal and transverse corners respectively.

The radially inward bowing achieved by the counter pressure provides that the subsequent blow moulding introduces a greater hoop stretch into the thermoplastic material as compared to the absence of a counter pressure as illustrated in FIGS. 3a and 3b. The thermoplastic material must move a greater radial distance during the blowing step as a result of having been radially inwardly deformed by the counter pressure prior to the blowing step.

The centre points 31, 33, 35, 37 and 39 of the longitudinal preform walls 30 and the centre points 43, 45, 47, 49 and 51 of the transverse preform walls 42 assume a locus which is, in plan view, substantially elliptical. The elliptical shape expands during blowing, representing an increase in the hoop stretch of the thermoplastic material.

The stretch ratios at the centre points can be readily calculated by those skilled in the art by measuring the initial preform length and the later preform length after a particular amount of stretching. For example, in the embodiment of FIGS. 4a and 4b, the preform has initial longitudinal and transverse dimensions and is stretched to form the various stretched structures illustrated by lines 30 to 38 and 42 to 50, and finally the shape of the mould.

The lines have the following hoop stretch ratios at the respective centre points: centre point 31=1.5:1; centre point 33=1.48:1; centre point 35=1.46:1; centre point 37=1.52:1; centre point 39=1.68:1; and longitudinal corner=1.91:1; centre point 43=1.74:1; centre point 45=1.67:1; centre point 47=1.72:1; centre point 49=1.75:1; centre point 51=1.97:1; and transverse corner=2.2:1. In contrast, in FIGS. 3a and 3a the centre point of the longitudinal wall 26 has a hoop stretch ratio 1.44:1 and the centre point of the transverse wall 28 has a hoop stretch ratio 1.63:1. This provides that the tub comprises biaxially oriented thermoplastic material in the annular sidewall and at least an outer portion of the bottom wall, wherein the average stretch ratio of the biaxially oriented thermoplastic material in the annular sidewall and at least the outer portion of the bottom wall is from 1.5:1 to 15:1, optionally from 1.5:1 to 10:1, typically about 10:1, for example by reducing a preform thickness of 2.5 mm to a tub wall thickness of 0.25 mm.

FIGS. 5a and 5b are schematic cross-sections through portions of a preform according to a fourth embodiment of the present invention. As for the embodiment of FIGS. 1 and 2, the preform 60 is substantially planar and has a raised peripheral flange 62 for forming an upper edge of the resultant tub. In this embodiment, the tub is a circular cross-section high aspect ratio pot, having a high depth compared to the pot diameter. Other shapes could of course be employed.

FIG. 6a is a schematic cross-section of the preform portion of FIG. 5a after axial stretching by a stretch rod 70 in a mould cavity prior to blow moulding, the mould cavity having a sidewall 64, a bottom wall 66 and an upper open face 68. In this embodiment the cavity does not have a counter pressure. The preform is stretched by the stretch rod 70 to form a linear reform wall section 72. Thereafter, the blowing gas is introduced as described above and the axially deformed preform is blown against the inside surface of the mould cavity to form the tub, in this embodiment the tub being in the form of a pot.

FIG. 6b is a schematic cross-section of the preform portion of FIG. 5b after stretch blow moulding into a mould cavity having a counter pressure, and progressive deformation of the thermoplastic material during the blow moulding. As described above with respect to the embodiment of FIGS. 4a and 4, the counter pressure causes inward bowing of the axially stretched preform wall 74. As the blowing gas is introduced, the counter pressure causes continued deformation of the preform wall, and the successive locations of the preform wall as it is blown against the mould surface are shown by lines 76, 78, 80, 82 and 84.

Again, the inward bowing causes an increase in hoop stretch of the preform wall. For example, in the embodiment of FIG. 5b, the preform has initial longitudinal and transverse dimensions and is stretched to form the stretched structure illustrated by lines 74 to 84, and finally the shape of the mould. The lines have progressively increasing hoop stretch ratios at the respective centre points. The hoop stretch at the lower part of the sidewall, lower corner and outer part of the bottom wall of the pot have a higher hoop stretch than in the corresponding parts of the pot made according to FIG. 6a which does not apply a counter pressure during stretch blow moulding.

For a high aspect ratio tub, having a high depth:width ratio, the sidewall is progressively blown against the side moulding face of the mould cavity, the contact point between the preform and the mould surface is initially at the top of the mould cavity, at the junction with the fixed upper edge of the preform, for example a flange. The contact point moves progressively downwardly. After the preform material has come into contact with the mould surface, the contacting material no longer stretches. The remaining uncontacting material, below the contact point, continues to stretch, and the height of remaining preform material available to stretch progressively decreases.

This phenomenon tends to cause the centre point of the preform wall to move progressively downwardly during blow moulding, which introduces a greater axial stretch ratio at a lower region of the sidewall, and at the corner between the sidewall and the base.

In contrast, in conventional thermoforming processes a large-area male portion, or plug, that is about 85% of the base area of the tub to be formed is moved downwardly against the sheet in order to stretch the sheet before blowing. This large area plug is employed to prevent the material touching the sidewall of the female mould cavity during the initial forming step.

In addition, the higher the aspect ratio of the container the higher the axial stretch ratio of the sidewall when blow moulding the container using the present invention. For a given base dimension, if the sidewall height is x, 2× or 4×, the axial stretch ration increases from about 3y:1, to 5y:1 to 9y:1. Thus the method of the referred embodiments of the present invention can increase both the axial stretch ratio and the hoop (radial) stretch ratio in a container sidewall.

Figure 7:
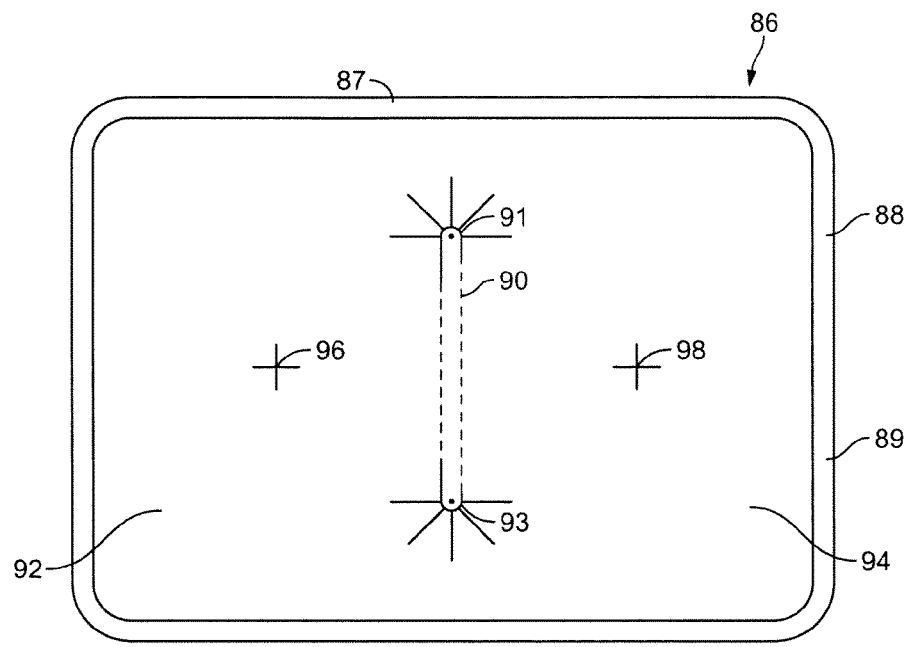
FIG. 7 shows a plan view of a two-compartment tub in accordance with a seventh embodiment of the present invention.

FIG. 7 shows a plan view of a two-compartment tub, in the form of a tray 86, in accordance with a seventh embodiment of the present invention. The tray 86 has a peripheral raised flange 88 having an upper sealing surface for sealing of a lid. The tray 86 is rectangular in this embodiment, although of course other shapes and dimensions could be employed. The tray has a longitudinal edge 87 and a transverse edge 89. The flange 88 surrounds two adjacent compartments 92, 94 separated by a central raised divider element 90 having opposite longitudinal ends 91, 93. Each compartment 92, 94 has a respective centre point 96, 98 against which a stretch rod is urged during manufacture by stretch blow moulding from a substantially flat injection moulded preform of biaxially orientable thermoplastic material, similar to those of FIGS. 1, 2 and 5.

Figure 8:
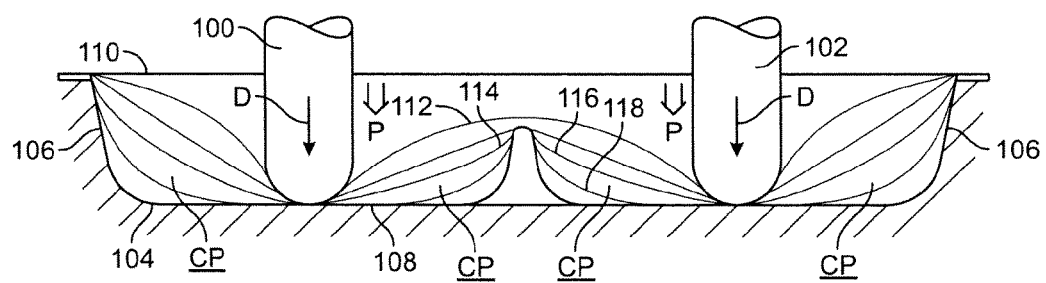
FIG. 8 is a schematic cross-section showing the manufacture of the tub of FIG. 7, in particular the position of the preform after stretch blow moulding into a mould cavity having a counter pressure, and progressive deformation of the thermoplastic material during the blow moulding.

FIG. 8 is a schematic cross-section showing the manufacture of the tub of FIG. 7 from the preform. In particular FIG. 8 illustrates the position of the preform during and after stretch blow moulding into a mould cavity of a mould 104 defining a sidewall 106, a bottom wall 108 and upper edge 110. In this embodiment, the mould cavity has a counter pressure, indicted by CP in the Figure, as described above. Also, two laterally spaced stretch rods 100, 102 are employed to provide initial axial stretching of the preform material to form a respective compartment 92, 94 of the tray 86. The Figure illustrates progressive deformation of the thermoplastic material during the blow moulding as a result of the combination of the applied blowing pressure, indicated by the arrows P, and the counter pressure.

After the initial axial stretching by the stretch rods 100, 102, the preform wall, as a longitudinal cross section, assumes the shape indicated by preform wall 112 of FIG. 8. At locations between the stretch rods 100, 102 and the flange 88 or the central upstanding mould structure to form the central raised divider element 90, the preform wall is upwardly and radially inwardly bowed towards the respective stretch rod 100, 102, similar to the embodiments of FIGS. 4a, 4b and 5b. As blow moulding commences and proceeds by introduction of blowing gas pressure P acting against the counter pressure CP, the preform wall successively assumes the positions of lines 114, 116 and 118 before finally being blown against the mould surface to form the desired tray shape. Again, the counter pressure increases the hoop stretch of the biaxially orientable material, particularly in the annular side walls of the compartments and at the corners between the sidewalls and the base.

In any of the embodiments of the invention, the method may further comprise heat setting the tub after the stretch blow moulding step. This may be achieved by holding the tub at an elevated temperature within the mould cavity thereby to increase the crystallinity of the thermoplastic material. In any of the embodiments of the invention, the method may further comprise quench cooling the tub after stretch blow moulding step. The quench cooling step can maintain the crystallinity of the thermoplastic material below a preset maximum threshold value.

For example, the biaxially oriented thermoplastic material in the annular sidewall and at least the outer portion of the bottom wall may be heat set to have a crystallinity of at least 30%, for example having a maximum crystallinity of 35% or a crystallinity of from 35 to 55%.

In any of the embodiments of the invention, the method may further comprise in-mould labeling on an outer side of the blow-moulded tub.

In one embodiment, the label is pre-charged with static electricity prior to being placed in the mould cavity before stretch blow moulding step iii). In a modification of that embodiment, or in another embodiment, an inwardly directed face of the label to be adhered to the tub outer surface is coated with a meltable layer, for example a low melting point polyolefin such as polyethylene, which has a melting point lower than the temperature of the preform during blow moulding, for bonding the label to the tub by fusion of the meltable layer.

The in-mould labeling step may be optionally further modified by providing a profiled outer surface preform which provides a plurality of air channels between the label and the preform surface. The channels provide passages for escape of air from between the label and the blown container outside surface which would otherwise cause blistering underneath the label.

Figure 10:
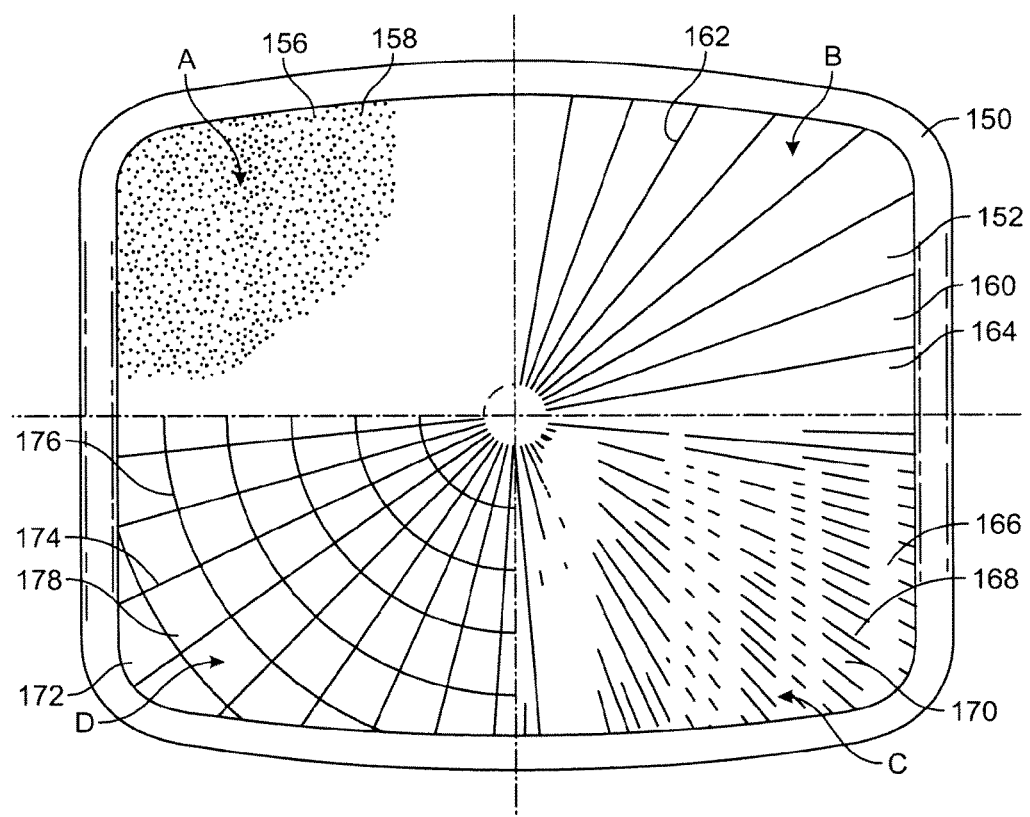
FIG. 10 is a schematic plan view of four alternative profiles of an outer surface of a preform for use in an in-mould labeling step according to ninth to twelfth embodiments of the present invention.

As shown in FIG. 10, which is a plan showing four different quadrants A, B, C and D, of profiles which may alternatively be employed in a preform 150 according to four alternative embodiments for forming a rectangular tub. Each profile is provided on the outer surface of the preform 150 which when blow moulded forms the outer surface of the resultant container. In any embodiment typically the entire substantially planar central portion 152 of the preform is provided with the respective profiled surface.

The profiled outer surface 154 illustrated in quadrant A comprises a regular or irregular array of raised nubs or dots 156 extending above the base surface 158 to provide surface texturing which provides the plurality of air channels.

The profiled outer surface 160 illustrated in quadrant B comprises a plurality of recessed grooves 162 in the base surface 164 to provide surface texturing which provides the plurality of air channels. The grooves 162 are continuous and radial in orientation, extending from the centre of the planar central portion 152.

The profiled outer surface 166 illustrated in quadrant C comprises a plurality of recessed grooves 168 in the base surface 170 to provide surface texturing which provides the plurality of air channels. The grooves 168 are discontinuous and radial in orientation extending from the centre of the planar central portion 152.

The profiled outer surface 172 illustrated in quadrant D comprises a plurality of recessed first and second grooves 174, 176 in the base surface 178 to provide surface texturing which provides the plurality of air channels. The first grooves 174 are continuous and radial in orientation extending from the centre of the planar central portion 152. The second grooves 176 are continuous and circumferential in orientation and surrounding the centre of the planar central portion 152.

For the profiled outer surfaces 160, 166 and 172, the grooves 162, 168, 174, 176 may have a rectangular, square or triangular (i.e. V-shaped) cross-section. A typical groove width is 0.15 to 0.25 mm, such as about 0.2 mm, and a typical groove depth is 0.15 to 0.25 mm, such as about 0.2 mm.

Figure 11:
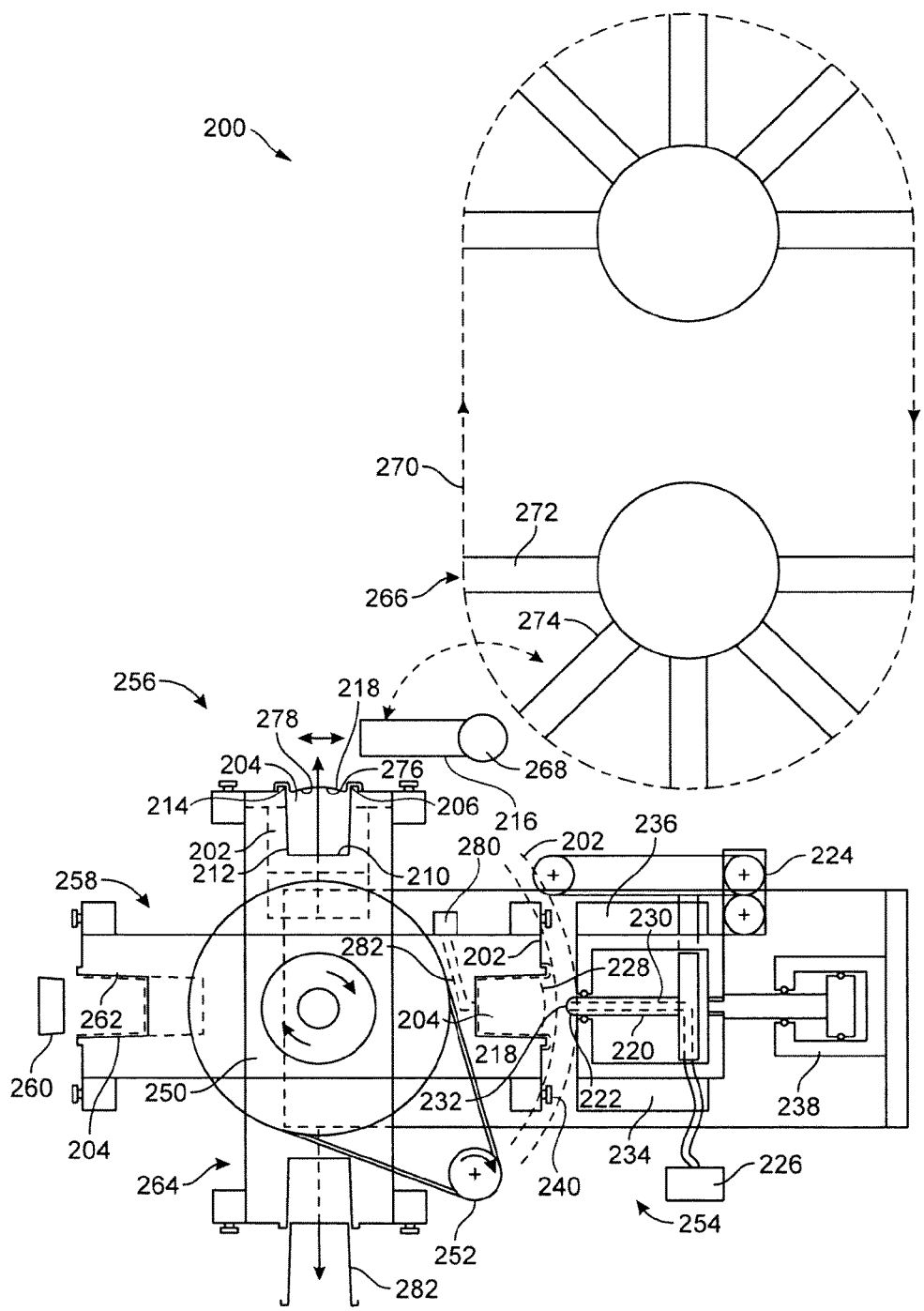
FIG. 11 is a schematic cross-section showing an embodiment of an apparatus according to the invention for stretch blow moulding a preform to form a container.

FIG. 11 is a schematic cross-section showing an embodiment of an apparatus according to the invention for stretch blow moulding a preform to form a container in the form of a tub.

The apparatus 200 comprises a female mould portion 202 having a mould cavity 204 with an open face 206. The mould cavity 204 has a bottom wall 210 and an annular sidewall 212. An upper edge 214 of the annular sidewall 212 surrounds the open face 206. The mould cavity 204 typically has a substantially circular, oval or elliptical cross-section or alternatively has a substantially polygonal, optionally square or rectangular, cross-section. The mould cavity bottom wall 210 typically has a surface area of from 3,500 to 40,000 mm$^2$ and the annular sidewall 212 has a height of from 35 to 150 mm. The mould cavity 204 may be shaped to form a peripheral edge of the resultant container which is adapted to engage a lid.

A preform placing device 216 is provided for placing an individual substantially planar preform 218 onto the female mould portion 212 so as to cover the open face 206 of the mould cavity 204.

A longitudinal elongate stretch rod 220 has a free end 222 directed towards the open face 206. A moving device 224, such as an electric, hydraulic or pneumatic actuator, is provided for reciprocally moving the stretch rod 220 along a direction aligned with a longitudinal axis of the stretch rod 220. The reciprocal motion is between a first position, at which the stretch rod 220 is located adjacent to the female mould portion 202 and the free end 222 is remote from the mould cavity 204, and a second position, at which the stretch rod 220 is located at least partly within the mould cavity 204. In the second position, the stretch rod 220 is typically located so as to extend into the mould cavity 204 by a distance which is from 75 to 100% of the height of the annular sidewall 212.

The stretch rod 220 is typically substantially cylindrical and the free end 222 is substantially hemispherical.

Typically, the open face 206 has a surface area of from 5,000 to 50,000 mm$^2$. Typically, the stretch rod 220 has a cross-sectional surface area which is from 100 to 500 mm$^2$. The area of the open face 206 may typically be from 200 to 350% of the cross-sectional surface area of the stretch rod 220.

As described above with respect to FIGS. 7 and 8, the apparatus may comprise a plurality of mutually laterally spaced stretch rods 220 which are commonly reciprocally movable by the moving device 224 between the first and second positions with respect to a common mould cavity 204.

A gas blowing device 226 is located for blowing gas against a side 228 of the placed preform 218 which faces away from the mould cavity 204. In some embodiments, the stretch rod 220 has a central conduit 230 (shown in phantom) and at least one outlet 232 at the free end 222 and the gas blowing device 226 is arranged to blow gas through the central conduit 230 and outwardly through the at least one outlet 232. The gas blowing device 226 is adapted to blow pressurized gas into the mould cavity 204 at a pressure of from 10 to 30 bar ($10 \times 10^5$ to $30 \times 10^5$ N/m$^2$), optionally from 20 to 25 bar ($20 \times 10^5$ to $25 \times 10^5$ N/m$^2$).

The apparatus further comprises a clamp mechanism 234 for clamping a peripheral edge 236 of the substantially planar preform 218 to the female mould portion 202. The clamp mechanism 234 comprises a clamp element 236. A pneumatic actuator 238 is coupled to the clamp element 236 and is adapted reciprocally to move the clamp element 236 towards and away from an edge portion 240 of the female mould portion 202 adjacent to the open face 206. Alternatively, the actuator may be a hydraulic or electric actuator.

The clamp mechanism 234 preferably includes a sealing system (not shown) to prevent the high pressure gas from losing pressure when being applied to the upper side of the preform, and in addition there may be provided a seal (not shown) around the stretch rod 220.

The apparatus 200 further comprises a rotatable carrier 250 around which a plurality, in the embodiment four, of the female mould portions 202 are located in mutually spaced relation. A drive mechanism 252 is provided for rotating the rotatable carrier 250 in an indexed manner successively to position respective female mould portions 202 at a stretch blow moulding station 254.

A preform placing station 256 is rotationally spaced upstream of the stretch blow moulding station 254 with respect to the direction of rotation of the rotatable carrier 250 by the drive mechanism 252. The preform placing device 216 is located at the preform placing station 256.

An in-mould label inserting station 258 is rotationally spaced upstream of the preform placing station 256 with respect to the direction of rotation of the rotatable carrier 250 by the drive mechanism 252. The in-mould label inserting station 258 includes a label inserting device 260 for placing a label 262 into the mould cavity 204.

A blow moulded container unloading station 264 is rotationally spaced downstream of the stretch blow moulding station 254 with respect to the direction of rotation of the rotatable carrier 250 by the drive mechanism 252.

A preform heating device 266 is provided together with a transfer mechanism 268 for transferring preforms 218 from the preform heating device 266 to the preform placing device 216. The preform heating device 266 comprises an endless conveyor 270 having a plurality of preform heating sections 272 located therealong. Each preform heating section 272 comprises a substantially planar heated surface 274 complementarily shaped to mate with at least some areas of the preform 218 and adapted conductively to heat a preform 218 disposed against the surface 274. The substantially planar heated surface 274 is adapted differentially to heat first and second portions of the preform 218. In particular, to heat a radially outer portion 276 of the preform 218 to a higher temperature than a radially inner portion 278 of the preform 218.

The apparatus 200 further comprises a pre-pressurising device 280 for introducing a pressurised gas into the mould cavity 204 prior to stretch blow moulding of the preform 218. The pre-pressurising device 280 includes at least one gas conduit 282 communicating with at least one of the bottom wall 210 and annular sidewall 212 of the mould cavity 204. The pre-pressurising device 280 is adapted to introduce pressurized gas into the mould cavity 204 at a pressure of from 5 to 15 bar ($5 \times 10^5$ to $15 \times 10^5$ N/m$^2$), optionally from 8 to 12 bar ($8 \times 10^5$ to $12 \times 10^5$ N/m$^2$). For clarity of illustration, the pre-pressurising device 280 is only illustrated for the mould cavity 204 located at the stretch blow moulding station 254.

The process flow is as follows. The mould cavity 204 indexed at the in-mould label inserting station 258 has a label 262 inserted therein. That mould cavity is then rotationally indexed to the preform placing station 256 at which the preform 218 is placed in position over the open face 206 by the placing device 216. The preform is received from the transfer mechanism 268 coupled to the preform heating device 266. The mould cavity 204 is then indexed to the stretch blow moulding station 254. The mould cavity 204 is pre-pressurised with gas, and the stretch rod 220 is descended into the mould cavity to axially stretch the preform 218. The pre-pressurised gas causes inward bowing towards the stretch rod 220, and also upwardly, of the axially stretched material. Then the blowing gas is introduced to radially stretch the material and form the moulded container 282. The counter pressure may preferably be canceled nearing the end of the blowing step, and trapped air is allowed to escape through the at least one gas conduit 282 that the counter pressure was introduced through. Most preferably, the counter pressure is terminated before the blow pressure is terminated. Typically the blow time is about 0.5 seconds and the counter pressure is canceled after 0.25 seconds. The mould cavity 204 is indexed to the unloading station 264 and the moulded container 282 is discharged. The mould cavity 204 is then indexed back to return to the in-mould label inserting station 258 for a subsequent moulding cycle.

As mentioned above, in this specification the term "tub" is employed as a general term meaning a wide mouth container which may be in the form of a tub, as that term may be used by some of those skilled in the art of moulded polymer containers, a tray, a pot, a jar, a cup, etc. The wide mouth of the container has an opening which has substantially the same or greater dimensions and area as compared to the body and base of the container. Alternatively, the upper edge of the tub is located inwardly of the annular sidewall of the tub to form a tub opening smaller in area than the area of the body of the tub, optionally the tub being shaped as a cauldron. The "tub" may have a variety of different shapes, dimensions and aspect ratios, for example a cauldron shape.

Various modifications to the illustrated embodiments will be apparent to those skilled in the art and are intended to be included within the scope of the present invention.

The invention claimed is:

1. A method of forming a blow moulded container in the form of a tub, the method comprising the steps of:
   i) providing an injection moulded preform composed of a biaxially-orientable thermoplastic material, the preform being substantially planar, wherein the substantially planar preform has a surface area A of from 5,000 to 50,000 mm², wherein the substantially planar preform has a wall thickness T of from 0.3 to 2.5 mm, over at least a central major portion of the preform, and wherein the substantially planar preform has an average bulk width W' and a bulk depth D', the bulk depth D' being at most 25 mm, and the ratio of average bulk width W':bulk depth D', defining a bulk aspect ratio, is at least 5:1, wherein the substantially planar preform includes a central recessed portion surrounded by a raised peripheral flange, the central recessed portion varying in thickness;

ii) heating the preform, wherein the heating step includes heating the central recessed portion having the varying thickness to correspondingly varying temperatures during the heating step; and iii) stretch blow moulding the heated preform within a mould cavity to form a tub having a bottom wall and an annular sidewall having an upper edge, the tub comprising biaxially oriented thermoplastic material in the annular sidewall and at least an outer portion of the bottom wall, the stretch blow moulding step using at least one stretch rod to engage an inner side of the preform and axially to stretch at least a part of the preform prior to blowing a pressurized gas against the inner side which urges the opposite side of the preform radially outwardly against the mould, wherein the tub bottom wall has a surface area of from 3,500 to 40,000 mm² and the annular sidewall has a height of from 35 to 150 mm.

2. A method according to claim 1 wherein the at least one stretch rod introduces axial orientation into at least a central part of the preform and the pressurized gas introduces hoop orientation into at least an outer part of the preform.

3. A method according to claim 2 wherein a plurality of mutually laterally spaced stretch rods is provided which engage respective mutually spaced areas on the inner side of the preform.

4. A method according to claim 1 wherein the substantially planar preform has a wall thickness T of from 0.5 to 1.9 mm over at least a central major portion of the preform.

5. A method according to claim 1 wherein the substantially planar preform has an average wall thickness of from 0.3 to 2.5 mm.

6. A method according to claim 5 wherein the substantially planar preform has an average wall thickness of from 0.5 to 1 mm.

7. A method according to claim 1 wherein the substantially planar preform has a maximum width W and an average wall thickness T, and the ratio of width W:wall thickness T is from 250:1 to 350:1.

8. A method according to claim 1 wherein the ratio of average bulk width W':bulk depth D', defining the bulk aspect ratio, is from 5:1 to 10:1.

9. A method according to claim 1 wherein the bulk depth D' is from 2 to 25 mm.

10. A method according to claim 1 wherein the substantially planar preform is substantially circular, oval or elliptical and the tub has a cross-section which is correspondingly substantially circular, oval or elliptical or wherein the substantially planar preform is substantially polygonal and the tub has a cross-section which is correspondingly substantially polygonal.

11. A method according to claim 1 wherein the pressurized gas has a pressure of from 10 to 30 bar ($10 \times 10^5$ to $30 \times 10^5$ N/m²).

12. A method according to claim 1 wherein the tubs are nestable or stackable or the upper edge of the tub is located inwardly of the annular sidewall of the tub to form a tub opening smaller in area than the area of the body of the tub.

13. A method according to claim 1 wherein the substantially planar preform has an overall general shape and configuration which is planar and the preform has some localised three-dimensional shaping.

14. A method according to claim 1 further comprising the step v) of in-mould labeling on an outer side of the blow-moulded tub.

15. A method according to claim 14 wherein in the in-mould labeling step the label is pre-charged with static electricity prior to being placed in the mould cavity before stretch blow moulding step iii).

16. A method according to claim 14 wherein in the in-mould labeling step a face of the label to be adhered to the tub outer surface being coated with a meltable layer for bonding the label to the tub by fusion of the meltable layer.

17. A method according to claim 14 wherein in the in-mould labeling step the preform has a profiled outer surface to provide a plurality of air channels between the label and the preform surface, the channels providing passages for escape of air from between the label and the outside surface of the blown container.

18. A method according to claim 1 wherein the upper edge of the container is adapted to engage a lid.

19. A method according to claim 1 wherein the flange of the injection moulded preform is pre-shaped with a lid-engaging or sealing surface structure which is present in the stretch blow moulded tub.

20. A method according to claim 1 wherein during the heating step ii) the preform is heated either conductively by contact with at least one heated element or by preheating using infrared and/or near-infrared radiation and subsequent thermal conditioning by conductive contact with at least one heated element.

21. A method according to claim 1 wherein during the heating step ii) the preform is differentially heated so that preform material in a first region to form a corner in the tub between the bottom wall and the annular sidewall is heated to a lower temperature than at least one adjacent second region.

22. A method according to claim 1 wherein the flange of the preform has a constant thickness which is heated to a common temperature during the heating step ii).

23. A method according to claim 1 wherein the central recessed portion is thinnest in a middle portion.

24. A method according to any foregoing claim 1 wherein the average stretch ratio of the biaxially oriented thermoplastic material in the annular sidewall and at least the outer portion of the bottom wall is from 1.5:1 to 15:1.

25. A method according to claim 1 wherein the at least one stretch rod axially stretches at least part of the substantially planar preform by a distance which is from 75 to 100% of the height of the annular sidewall.

26. A method according to claim 1 wherein the stretch blow moulding step iii) is controlled so that, after the preform has been axially stretched by the at least one stretch rod and before blowing of the pressurized gas against the inner side, the axially stretched preform includes a portion with a substantially truncated conical or pyramidal shape having an axis aligned with a respective stretch rod.

27. A method according to claim 1 wherein prior to the stretch blow moulding step iii) the mould cavity is pre-pressurised with a gas.

28. A method according to claim 27 wherein during the stretch blow moulding step iii), after the preform has been axially stretched by the at least one stretch rod and before blowing of the pressurized gas against the inner side, the pre-pressurised gas applies a resistance force against the opposite side of the preform to cause at least one region of the preform surrounding the stretch rod to bow radially inwardly towards the stretch rod.

29. A method according to claim 28 wherein before blowing of the pressurized gas against the inner side the at least one region of the preform surrounding the stretch rod has a truncated conical or pyramidal surface with at least one concave inwardly-curved side.

30. A method according to claim 27 wherein the pre-pressurised gas has a pressure of from 5 to 15 bar ($5 \times 10^5$ to $15 \times 10^5$ N/m$^2$).

31. A method according to claim 1 further comprising the step vi) of heat setting the tub after stretch blow moulding step iii) by holding the tub at an elevated temperature thereby to increase the crystallinity of the thermoplastic material.

32. A method according to claim 1 further comprising the step vii) of quench cooling the tub after stretch blow moulding step iii) to maintain the crystallinity of the thermoplastic material below a preset maximum threshold value.

33. A method according to claim 1 wherein the biaxially oriented thermoplastic material in the annular sidewall and at least the outer portion of the bottom wall is heat set and has a crystallinity of at least 30%.

34. A method according to claim 1 which is a two-step reheat blow moulding method in which the injection moulded preform is cooled to ambient temperature prior to the heating step ii).

35. A method according to claim 1 wherein heating step ii) heats the preform from a temperature of less than 35° C. in a reheat step after the injection moulded preform has cooled to a temperature of less than 35° C.

36. A method according to claim 1 wherein the thermoplastic material comprises polyester.

37. A method according to claim 36, wherein the polyester is selected from at least one of polyethylene terephthalate, polybutylene terephthalate, polyethylene naphthalate and polybutylene naphthalate.

38. A method according to claim 1 wherein the thermoplastic material comprises polyolefin.

39. A method according to claim 38, wherein the polyolefin is selected from at least one of polyethylene, polypropylene and polybutylene.

40. A method according to claim 1 wherein in the preform the thermoplastic material is substantially unoriented and amorphous or semi-crystalline and have some orientation resulting from an injection moulding process.

41. A method according to claim 1 wherein prior to the stretch blow moulding step iii) the heated preform is located so as to extend across an open face of the mould cavity.

* * * * *